Patented Mar. 4, 1947

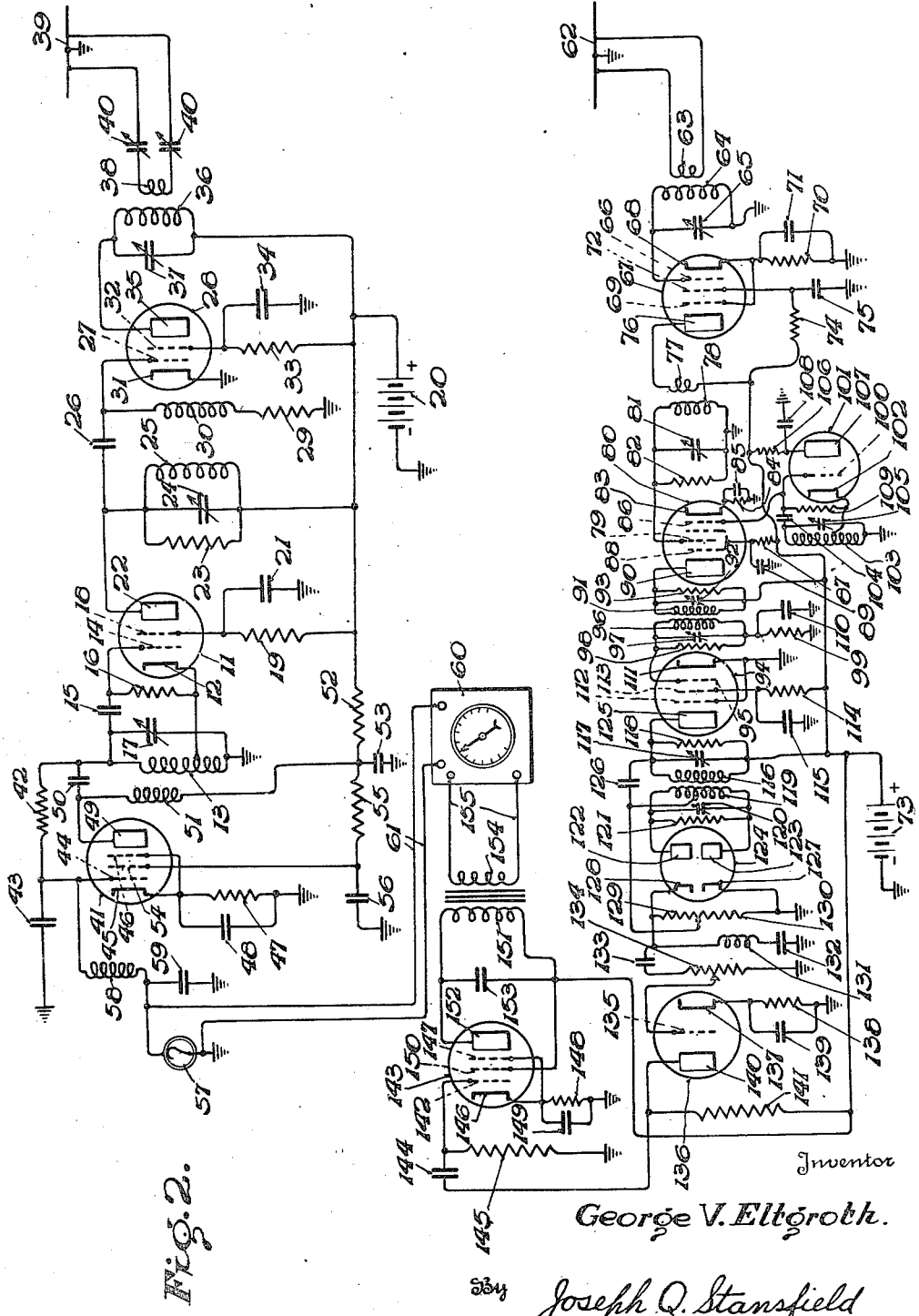

2,416,741

UNITED STATES PATENT OFFICE 2,416,741

RADIO DISTANCE MEASURING APPARATUS

George V. Eltgroth, Towson, Md., assignor to Bendix Aviation Corporation, South Bend, Ind., a corporation of Delaware Application October 15, 1942, Serial No. 462,167

4 Claims. (Cl. 250—1)

This invention relates to the measurement of distance by the use of radiant energy and more particularly to a system utilizing radio transmission for the measurement of distance between two points.

Green, U. S. Patent 1,750,668, and Holmes, U. S. Patent 2,198,113, both describe systems in which distance is determined by phase measurements on energy transmitted and retransmitted between two points in the form of amplitude modulation. These systems utilize transmitters radiating different frequency carriers at each of the two points and the mode of operation is about as follows: A radio transmitter at the reference location is amplitude modulated with energy from a low frequency source of alternating current and the energy transmitted is received and demodulated at a distant point; the output of the remote demodulator is now employed to amplitude modulate the output of an associated transmitter working on a carrier frequency spaced from that of the reference transmitter, and signals from the remote transmitter are received and demodulated at the reference location. The linear separation between the two points is now determined by measurement of the phase relation between the outgoing and incoming modulation at the reference location, as this phase shift is a function of the total distance traversed by the radio waves.

A complete system was constructed in accordance with the teachings of the above patents employing amplitude modulation and placed in operation utilizing a modulation frequency of 1000 cycles per second. During the tests, it was found that the distance indications were sometimes in error by distances of 12 miles or more, depending upon the adjustment and tuning of the receivers employed, and this error was ultimately traced to the phase shift of the modulation envelope occurring within the receiver, which was as much as 50 degrees when the receiver was tuned exactly to resonance and varied rapidly with slight mistuning of the receiver. Systems of this nature find their primary application in the navigation of aircraft and it is well known that the demands of other operations on the time of the operator are such as to preclude the use of equipment requiring very precise adjustment to secure error free indications. Consequently, the use of systems of the above type has been severely limited with the resultant loss of a potentially valuable aid to navigation.

Phase shift between the modulation envelope of the input current to a parallel resonant circuit and the modulation envelope of the voltage appearing across the parallel resonant circuit is due to the fact that the side bands are shifted in phase with respect to the carrier. When a wave modulated with a frequency equal to $\frac{1}{10}\%$ of the carrier frequency is impressed on a parallel resonant circuit having a Q of 200, the high frequency sideband is caused to lag its normal position by approximately 8 degrees, while the low frequency sideband is caused to lead by the same amount and the modulation envelope of the voltage across the circuit is therefore shifted in phase from that of the modulation envelope of the input current by 8 degrees. The average receiver may have six cascaded tuned circuits each contributing to the overall phase shift which is thus 48 degrees with the receiver tuned accurately to resonance and varies rapidly with even slight mistuning as the phase relations between the sidebands and carrier are altered. While it is theoretically possible to overcome the above defect by the use of low Q circuits in the receivers, in practice the required Q is so low that an economically excessive number of tuned circuits is required to obtain the necessary selectivity and gain.

One of the principal objects of the invention is to provide a new and novel radio distance measuring system having improved accuracy.

Another object of the invention is to provide a radio distance measuring system in which the operation is simplified, and a high degree of skill is unnecessary.

Still another object of the invention is to provide a radio distance measuring system in which accurate tuning of the transmitting and receiving apparatus is not absolutely necessary for accurate indications.

The above objects and advantages of the invention are accomplished by making use of frequency modulation in the transmitters at the reference and remote points and providing the receivers at these locations with frequency modulation detectors. I have found that the presence of phase shift in the tuned circuits through which frequency modulated energy is passed is without effect on the phase of the demodulated output and produces only amplitude distortion in this energy. Further, since the amount of phase shift produced during modulation, for example, of a carrier wave 75 kilocycles on either side of the mean carrier frequency by a 1000-cycle wave is about 4300 degrees which is far in excess of the 50 degrees or so contributed by the receiver tuned circuits, the distortion introduced by phase shift in the receiver tuned circuits thus can never rise to a magnitude that will appreciably impair the accuracy of the phase indication.

Other objects and advantages of the invention will in part be described and in part be obvious when the following specification is read in conjunction with the drawings in which:

Figure 2 is a schematic diagram of the apparatus situated at the reference location or point at which the transmission originates.

Figure 1:
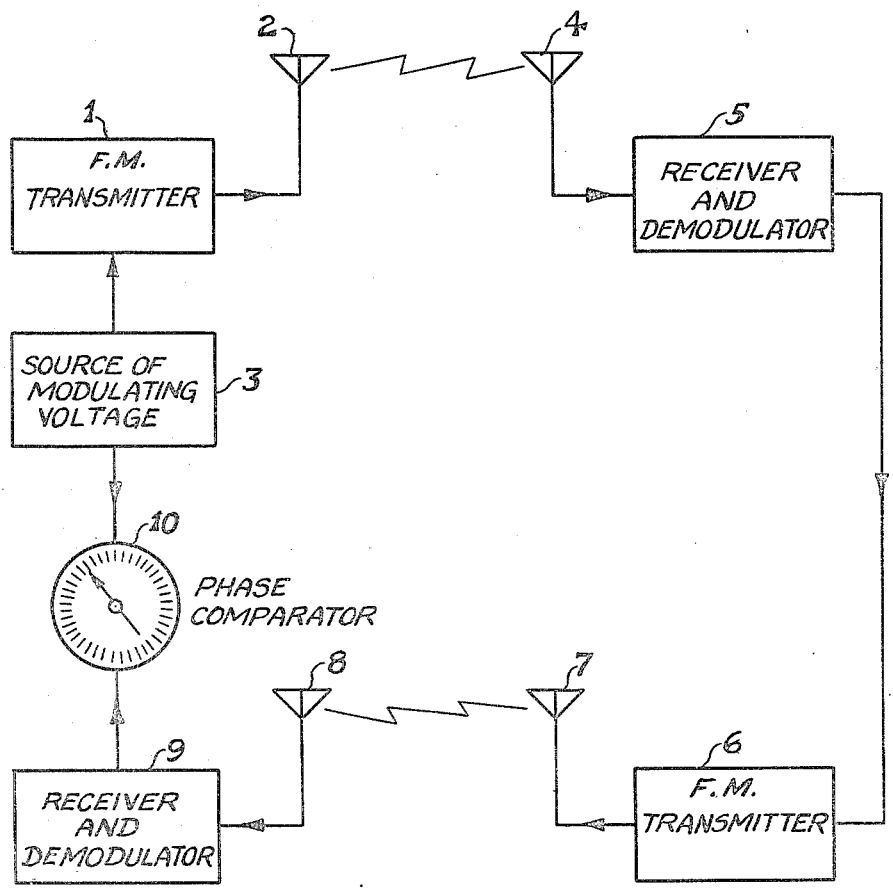
Figure 1 is a block diagram illustrating the elements of the operation of the system described.

Referring to Figure 1, the transmitter 1 is connected to the radiating antenna 2 and the output of the transmitter is modulated by the output of the modulating source 3. The radiated energy is intercepted at the mobile location by the receiving antenna 4 whose output is impressed on the receiver and demodulator 5 and the output of the demodulator is in turn utilized to modulate the output of the transmitter 6, preferably operating on a frequency different from that of transmitter 1, and this output is then radiated from transmitting antenna 7. The energy thus relayed is received by the antenna 8 and conveyed to the input of receiver and demodulator 9 whose output is connected to phase comparator 10. The phase comparator 10 is also connected to the source of modulation voltage 3 and indicates the phase difference between the incoming modulation envelope and the outgoing modulation envelope. Inasmuch as this phase difference is determined by the time required for the round trip of the electromagnetic energy between these two points, the linear separation may be readily determined. When a modulating frequency of 1000 cycles per second is employed, a phase shift of 360 degrees exists when the two sets of apparatus are separated by 93 miles and consequently each degree indication on the phase meter corresponds to a distance increment of approximately one quarter mile. The system in this elementary form has already been described in the earlier mentioned patents.

Figure 2 illustrates and the following description describes in detail the apparatus located at the reference and mobile locations. The heaters associated with the emissive cathodes of the vacuum tubes employed in this apparatus have been omitted from the drawings for the purpose of simplicity and clarity.

Turning to Figure 2 there is shown the oscillator tube 11 with the cathode 12 connected to a tap on the oscillator coil 13. One end of coil 13 is grounded while the other end is connected to the control grid 14 of oscillator tube 11 through the condenser 15. A direct current path between control grid 14 and cathode 12 is established through the grid leak resistor 16. The mean frequency of oscillation of this portion of the circuit is determined by the adjustment of the variable condenser 17 connected across the ends of inductance 13. The space charge grid 18 of oscillator tube 11 is connected to the positive terminal of the direct current source 20 through the dropping resistor 19 and grid 18 is grounded for radio frequency potentials by the bypass condenser 21 connected between this grid and ground. The two grids and the cathode of oscillator 11 cooperate to produce oscillations in the inductance 13 and capacitor 17 after the well known manner of the Hartley oscillator. These oscillations vary the electron current arriving at the anode 22 which is connected to the positive terminal of source 20 through the parallel circuit of resistance 23, capacitance 24 and inductance 25, and voltages at the oscillation frequency of the inner element assembly appear across the loaded tuned output circuit.

The condenser 26 connected between the anode 22 and the control grid 27 of the power amplifier 28 transfers the output energy from the oscillator to this point. Amplifier 28 is biased by the grid current flowing through the combination of resistance 29 and choke 30 connected between control grid 27 and ground. Cathode 31 is connected to ground and the space charge grid 32 is connected to the positive terminal of source 20 through the dropping resistor 33. Grid 32 is grounded for radio frequency potentials by the bypass condenser 34 connected between this grid and ground. Anode 35 is also connected to source 20 through the output load circuit including inductance 36 paralleled by capacitor 37, and the energy developed in this circuit is transferred to the secondary winding 38 which is connected to the radiating antenna 39 in series with the antenna tuning capacitors 40.

Modulation of the oscillator output is effected by the circuit including modulator tube 41. A portion of the energy from the tuned oscillator circuit is taken off by the series combination of resistance 42 and capacity 43 connected between the ungrounded terminal of inductance 13 and ground and the voltage developed across capacitor 43 is impressed on the control grid 44 which is connected to the junction between resistor 42 and capacitor 43. The cathode 45 of tube 41 is connected to the suppressor grid 46 and both elements are returned to ground through the parallel combination of resistance 47 and capacitor 48. Anode 49 of tube 41 is connected to the ungrounded terminal of inductance 13 through the capacitor 50 and is connected to the positive terminal of source 20 through the choke 51 and resistance 52. The low potential end of resistance 52 is grounded by the bypass capacitor 53 connected to ground therefrom. Also situated in tube 41 is the space charge grid 54 which is connected to the low potential end of resistor 52 through the dropping resistor 55 and is maintained at ground potential for radio frequency currents by the capacitor 56 connected between the grid end of resistor 55 and ground. Modulating potentials for the tube 41 are derived from the modulation source 57 having one terminal grounded and the other terminal connected to control grid 44 through the isolating choke 58 having high impedance at the oscillator frequency. Source 57 preferably has low direct current resistance to afford a grid return for tube 41 and is shunted by the capacitor 59 to prevent the appearance of radio frequency potentials across the output terminals thereof. Output energy from source 57 is also impressed on a set of input terminals of the phase meter 60 via the leads 61.

In operation, the voltage across the capacitor 43 lags the voltage across the oscillator tuned circuit and, since the plate current of modulator 41 is in phase with the impressed grid signal, this tube draws a lagging current from the tuned circuit. The magnitude of the lagging current drawn is controlled by the bias on control grid 44 and the modulator tube 41 consequently appears to the tuned circuit as a variable shunt inductance whose variations are controlled by the output of modulation source 57, producing variations in the output frequency of oscillator 11 controlled by the waveform of the modulating potential. The frequency modulated output of oscillator 11 is amplified by power amplifier 29 and then radiated from the antenna 39. The resistance 23 across the oscillator output circuit broadens the response of the tuned circuit to prevent the introduction of distortion by excessive phase shift variations in this circuit during the modulation cycle. In the output circuit of amplifier 29, the same function is achieved by coupling the secondary 38 to the primary 36 closely enough to provide the proper reflected resistance across primary 36. The energy radiated by the antenna 39 is received at the craft whose location is to be determined, demodulated and employed to frequency modulate the emission of another transmitter on the craft operating on a frequency different from that of the transmitter just described. This reradiated energy is intercepted by receiving antenna 62 and impressed on the transformer primary 63 which then transfers it to the secondary winding 64 tuned by the variable capacitor 65. One terminal of secondary 64 is connected to ground, while the other is connected to the control grid 66 of the radio frequency amplifier tube 67. Tube 67 is provided with a cathode 68 which is connected to ground through the parallel resistance 70 and capacitor 71 to provide operating bias for control grid 66. The space charge grid 72 is connected to the positive terminal of the direct current source 73 by the dropping resistor 74 and is grounded for radio frequency currents by the bypass capacitor 75 connected between this grid and ground, while the anode 76 is connected directly to source 73 through the primary winding 77 of the interstage coupling transformer. Alternating current energy in the anode circuit of tube 67 is transferred to the secondary winding 78 of the interstage coupling transformer by virtue of its coupling with primary winding 77 and impressed on the signal control grid 79 of the mixer tube 80. The voltage developed across winding 78 is increased by tuning this winding with the variable condenser 81 and the response of the tuned circuit is broadened by the resistor 82 in parallel with condenser 81 to insure the passage of all the necessary sidebands. The cathode 83 of tube 80 is connected to ground through the paralleled resistor 84 and capacitor 85 to provide the necessary operating bias for the signal grid 79 of the mixer tube 80. The inner grid 86 of mixer tube 80 is connected to the control grid 100 of the oscillator tube 101 which is connected as a Hartley oscillator with cathode 102 connected to the tap on the oscillator inductance 103 having one terminal grounded and the other connected to control grid 100 by the capacitor 104. The oscillator grid bias is provided by the grid current flowing through the grid leak resistor 109 connected between control grid 100 and the cathode 102, while the oscillator frequency is determined by the value of the variable capacitor 105 connected across the coil 103. The electrical energy necessary to the operation of the oscillator is supplied from the source 73 through the dropping resistor 106 to the anode 107 which is grounded for radio frequency currents by the bypass capacitor 108. Signal grid 79 of tube 80 is surrounded by the space charge grid 88 energized from source 73 through the resistor 87 and grounded for radio frequency by the bypass condenser 89 connected from grid 88 to ground and the signals on grids 79 and 86 coact on the electron stream from the cathode 83 to provide not only the original input frequencies, but also beat frequencies in the current flowing to the anode 90 which is connected to the positive terminal of source 73 through the parallel circuit of transformer primary 91, tuning capacitor 92 and loading resistor 93. The tuning of this current serves to select the desired beat frequency in the output of mixer 80 in the manner well known to those familiar with superheterodynes.

The output energy from the mixer 80 is transferred to the control grid 95 of the limiter tube 94 by transformer action between primary winding 91 and the secondary winding 96 tuned by the capacitor 97 parallel by the loading resistor 98, and the control grid 95 derives its operating bias from the grid current flowing through the resistor 99 connected between the low potential end of winding 96 and ground. The dynamic characteristics of the limiter are largely fixed by the capacitor 110 connected across resistor 99 and ground. The cathode 111 and suppressor 112 of the limiter tube 94 are connected directly to ground, and the space charge grid 113 is energized by energy obtained from source 73 through the resistor 114 connected at its low potential end to the grid 113 and the grounded bypass capacitor 115. The output of limiter 94 appearing across the anode load circuit formed by the transformer primary 116 paralleled by tuning capacitor 117 and the loading resistor 118 connected to the positive terminal of source 73 and to the anode 125 is substantially constant regardless of frequency variations occurring during the modulation cycle and changes in the amplitude of the input signal because of the self-regulating action of the voltage developed across resistor 99. Signal voltages also appear in the center tapped secondary winding 119 which is coupled to primary winding 116 and winding 119 is tuned to resonance with the signal by means of the tuning capacitor 120 shunted with the loading resistor 121. The two ends of winding 119 are connected respectively to anode 122 and anode 123 of the discriminator rectifier 124 while the center tap of winding 119 is connected to the anode 125 of limiter 94 by the blocking capacitor 126. The cathode 127 associated with anode 123 is connected directly to ground and cathode 128 associated with anode 122 is connected to ground through the two serially connected resistors 129 and 130 having their junction point connected to the center tap of winding 119. Cathode 128 is grounded for currents of the signal frequency by the series resonant circuit tuned to the selected operating beat frequency in the output of mixer 80 consisting of the inductance 131 and capacitor 132 connected between this point and ground. In a manner familiar to those skilled in the art, variations in the frequency of the signal impressed on primary winding 116 give rise to corresponding variations in the voltage between cathode 128 and ground; since the signal is frequency modulated by the output of the modulator source 57, there therefore appears at cathode 128 an output voltage having the same frequency and substantially the same waveform as the source 57. However, this voltage is displaced in time or phase by an amount dependent on the time required for the signal round trip between the reference location and the unknown location of the craft bearing the relay equipment, and this time may thus be determined by the measurement of the phase displacement.

The output power from the discriminator rectifier 124 is insufficient for the operation of many phase measuring devices so it is transmitted through condenser 133 to the potentiometer 134 having an adjustable tap connected to the control grid 135 of the audio frequency amplifier 136. The cathode 137 of amplifier 136 is connected to ground through the cathode bias resistor 138 paralleled by the bypass capacitor 139 and the anode 140 is connected to the positive terminal of source 73 through the anode load resistor 141. Amplification takes place in this stage in a manner well known and the voltage appearing across the anode load resistor 141 is impressed on control grid 142 of the power amplifier 143 via the coupling capacitor 144 whose grid terminal is grounded through grid leak resistor 145. Power amplifier cathode 146 and the suppressor 147 are connected together and to ground through the familiar combination of resistance 148 shunted by capacitor 149, the space charge grid 150 being connected directly to the positive terminal of source 73 while the output transformer primary winding 151 is connected between this point and the anode 152. If desired, primary 151 may be shunted by a capacitor 153 to reduce the intensity of whatever harmonics may be present in the output of the power amplifier 143. The secondary winding 154 is coupled to primary winding 151 and is connected to a second set of input terminals on the phase meter 60 by the connecting leads 155. Phase meter 60, which may have the structure of any of the many well known types, is thus connected to the output of the modulation source 57 and to the output of the frequency modulation receiver including the power amplifier 143 and continuously indicates the phase relation existing between the voltages appearing at these points.

The apparatus employed on the craft whose location is to be determined is identical with that shown in Figure 2 save that phase meter 60 and the modulation source 57 are omitted and the output winding 154 has one terminal connected to ground and the other to the junction between capacitor 59 and the isolating choke 58. At the mobile or unknown location, therefore, the output of the receiver is used to modulate the emission of the transmitter which operates on a frequency different from that radiated by the transmitter at the reference location, and the emanation of the transmitter at the mobile location is received by the receiver at the reference location. The demodulated output of the receiver is then compared in phase with the modulating voltage impressed on the frequency modulator to indicate the separation of the two transmitters.

As an alternative to the apparatus above outlined at the mobile location, the signal from the reference location may be received, amplified, translated to a new position in the frequency spectrum by modulation with a fixed frequency oscillator, again amplified and then re-radiated to the reference location. In this system, all audio frequency circuits are eliminated at the mobile location thereby avoiding the phase shift which may occur therein.

In operation, the transmitting frequency is controlled by the adjustment of the variable capacitor 17, and capacitors 24, 37, and 40 are adjusted to secure maximum radiated power. In the receiver, capacitors 92, 97, 117, and 120 are adjusted for maximum gain at a predetermined fixed frequency termed the intermediate frequency and capacitors 65 and 81 are set to provide the best gain and selectivity at the signal frequency, which may vary. The output frequency of oscillator 101 is adjusted by varying capacitor 105 until the desired beat frequency is developed in the anode circuit of the mixer 80. With frequency modulation employed as outlined in the foregoing description, it is found that errors in receiver tuning adjustment do not shift the phase of the output from the audio amplifier circuits with respect to the modulation phase in the input signal and the indications obtained on phase meter 60 may be relied upon under all conditions to an accuracy determined only by the accuracy of the phase meter itself. The advantage over previously built structures employing amplitude modulation in which extremely careful and accurate adjustment of the receiver tuning controls was imperative if errors were to be held to values of less than 5 degrees is clear. In the system of the invention, the receivers may be tuned in the customary carefree manner, and so long as any signal is obtained from the receiver output at the reference location, the indication is the correct one.

It will be obvious that many changes and modifications may be made in the invention without departing from the spirit thereof as expressed in the foregoing description and in the appended claims.

I claim:

1. In a radio distance measuring system, means for radiating a frequency modulated carrier, means remotely located from said radiating means for receiving said frequency modulated carrier, transmitting means connected to said receiving means radiating a frequency modulated carrier with a modulation characteristic controlled by the modulation characteristic of said first mentioned frequency modulated carrier and having a mean carrier frequency differing from that of said first mentioned carrier, means for receiving said second mentioned frequency modulated carrier, and indicating means responsive to the phase difference between the modulation characteristic of said first mentioned frequency modulated carrier and the modulation characteristic of said second mentioned frequency modulated carrier.

2. In a radio distance measuring system, a source of modulating potentials, a source of periodic energy, modulating means for varying the output frequency of said second mentioned source in accordance with said modulating potentials, means for radiating the variable frequency periodic energy produced by the action of said modulating means, means remotely located from said radiating means for receiving said radiated periodic energy and demodulating said energy to produce a replica of said modulating potentials, a second source of periodic energy, means for varying the output frequency of said second mentioned source of periodic energy in accordance with said modulation potential replica, means for radiating the variable frequency periodic energy controlled by said modulation potential replica, means for receiving said replica controlled periodic energy, means for demodulating said second mentioned received energy, and indicating means responsive to the phase difference between the output of said first mentioned source and the output of said demodulating means.

3. In a radio distance measuring system, a source of modulating voltage, means for radiating a carrier controlled by the output of said source, selectively responsive receiving and demodulating means actuated by said carrier in which the phase relation between input modulation and output is independent of the tuning of said receiving and demodulating means with respect to the carrier frequency remotely located from said radiating means, means for radiating a second carrier controlled by the output of said receiving and demodulating means, selectively responsive receiving and demodulating means actuated by said second carrier in which the phase relation between input modulation and output is independent of the tuning of said receiving and demodulating means with respect to said second carrier frequency, and phase responsive means connected to the output of said second receiving demodulating means and to the output of said source of modulating voltage.

4. In a radio distance measuring system, a source of modulating potentials, means for radiating a frequency modulated carrier controlled by said modulating potentials, means remotely located from said radiating means for receiving said frequency modulated carrier, transmitting means connected to said receiving means radiating a frequency modulated carrier with a modulation characteristic controlled by the modulation characteristic of said first mentioned frequency modulated carrier and having a mean carrier frequency differing from that of said first mentioned carrier, means for receiving said second mentioned frequency modulated carrier, a frequency modulation detector responsive to the output of said second mentioned receiving means and indicating means responsive to the output of said source of modulating potentials and to the output of said frequency modulation detector.

GEORGE V. ELTGROTH.

REFERENCES CITED

The following references are of record in the file of this patent:

UNITED STATES PATENTS

| Number | Name | Date |
|---|---|---|
| 2,147,810 | Alford | Feb. 21, 1939 |
| 2,248,727 | Strobel | July 8, 1941 |
| 2,301,929 | Budenbom | Nov. 17, 1942 |